United States Patent
Luinstra et al.

(10) Patent No.: US 7,019,107 B2
(45) Date of Patent: Mar. 28, 2006

(54) METHOD FOR THE PRODUCTION OF POLY(3-HYDROXYALKANOATES) IN THE PRESENCE OF A NUCLEOPHILE

(75) Inventors: Gerrit Luinstra, Mannheim (DE); Markus Allmendinger, Deggingen (DE); Bernhard Rieger, Oberelchingen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/505,707

(22) PCT Filed: Feb. 26, 2003

(86) PCT No.: PCT/EP03/01933

§ 371 (c)(1),
(2), (4) Date: Aug. 26, 2004

(87) PCT Pub. No.: WO03/074585

PCT Pub. Date: Sep. 12, 2003

(65) Prior Publication Data

US 2005/0107573 A1    May 19, 2005

(30) Foreign Application Priority Data

Mar. 1, 2002 (DE) ................. 102 08 810

(51) Int. Cl.
*C08G 59/68* (2006.01)
*C08G 65/10* (2006.01)

(52) U.S. Cl. ............... 528/410; 528/392; 528/393; 528/403; 528/405; 528/412; 528/417; 528/425; 524/714; 524/785; 524/796

(58) Field of Classification Search ........... 528/392, 528/393, 403, 405, 410, 412, 417, 425; 524/714, 524/785, 796
See application file for complete search history.

(56) References Cited

U.S. PATENT DOCUMENTS 5,310,948 A    5/1994   Drent et al.
5,359,081 A   10/1994   Drent et al.

FOREIGN PATENT DOCUMENTS

WO   94/00506   1/1994
WO   95/20616   8/1995

OTHER PUBLICATIONS

Y. Doi, Microbial Polyester, VCH Weinheim 1980, pp. 1-14.
Y. Doi, Microbial Polyester, pp. 21-32.
Y. Doi, Microbial Polyester, pp. 107-133.
Seebach et al., Helv. Chim. Acta 1994, 77, pp. 1099-1123.
Lengweiler, Helv. Chim. Acta 1996, 79, pp. 670-701.
Breitschuh et al., Chimia 1990 (44), pp. 216-218.
Ohta et al., J. Chem. Soc. Chem. Commun. 1992, pp. 1725-1726.
Gross et al., Macromolecules 1988 (21), pp. 2657-2668.
Zhang et al., Polymer Preparatio, 1989 (30), pp. 400-401.
Jedlinski et al., Macromolecules 1990 (31), pp. 6718-6720.
Zhang et al., Macromolecules 1990 (23), 3206-3212.
Kricheldorf et al., Macromolecules 1994 (27), pp. 3139-3146.
Patent Abst. Japan, 06220179.
Hori et al., Macromolecules 1993, (26), pp. 5533-5534.

*Primary Examiner*—Samuel A. Acquah
(74) *Attorney, Agent, or Firm*—Novak Druce & Quigg, LLP; Jason D. Voight

(57) ABSTRACT

The invention relates to a catalytical process for preparing poly(3-hydroxyalkanoates) by copolymerizing an oxirane compound with carbon monoxide in the presence of a) at least one single- or multicenter neutral transition metal complex (A) based on a metal of groups 5 to 11 of the Periodic Table of the Elements, in which the metal center(s) is/are present in the formal oxidation state 0, and/or b) at least one single- or multicenter anionic transition metal complex (B) based on a metal of groups 5 to 11 of the Periodic Table of the Elements, where multicenter transition metal complexes have metal centers which, without exception, are of the same transition metal, which comprises carrying out the copolymerization in the presence of at least one nucleophile other than hydroxy-substituted pyridine compounds.

14 Claims, No Drawings

METHOD FOR THE PRODUCTION OF POLY(3-HYDROXYALKANOATES) IN THE PRESENCE OF A NUCLEOPHILE

The present invention relates to a process for preparing poly(3-hydroxyalkanoates).

Poly(β-hydroxy fatty acids) and poly(3-hydroxyalkanoates) are of great interest from an environmental and also an economic point of view as polymers which are fully biodegradable. This also applies in particular to polyhydroxybutyrolactone, which under certain circumstances has a thermoplastic property profile.

Polyhydroxybutyrolactones have hitherto been prepared via fermentation (see also Y. Doi, Microbial Polyester, VCH Weinheim 1980, pp. 1 to 14, inter alia; and Biopol® product brochure from Zeneca Ltd., 1993). However, the resultant polymer product is difficult to obtain in pure form from the fermentation mixture (Y. Doi, ibid., pp. 21 et seq.) For example, the cells first have to be disrupted before the crude polymer product can be extracted. The resultant production costs are therefore currently uncompetitive with those for conventional thermoplastics. Another disadvantage is that the polymer prepared via microorganisms is produced exclusively in highly isotactic form, giving it a high melting point of above 180° C. and making it unusable for commonly used plastics processing techniques, such as extrusion or injection molding, because decomposition reactions occur. Irrespective of this, the materials are also relatively stiff and brittle. The commercially available product Biopol® from Zeneca Ltd. therefore also contains at least small proportions of randomly distributed hydroxyvalerate units, alongside hydroxybutyrate units as main constituent. This has been the only way of obtaining a sufficiently flexible and tough material (see also Y. Doi, ibid., pp. 107–133).

According to WO 94/00506 and WO 95/20616, ring-opening polymerization of β-butyrolactone is another way of obtaining poly-β-hydroxybutyrolactone. However, these reactions do not proceed stereospecifically, and give atactic polymers which are viscous liquids at room temperature and are likewise unusable for commonly encountered applications of polymer materials. Irrespective of this, according to WO 94/00506 the only way of obtaining acceptable yields and molecular weights is to carry out the polymerization under conditions of complete or almost complete exclusion of water, employing complicated drying measures for the reagents and apparatus used. The same applies to the process described in WO 95/20616, in which alkyl zinc alkoxides are used instead of the carboxylate anions to be used in WO 94/00506 as initiators.

In both of the abovementioned instances, enantiomerically pure β-butyrolactone has to be used as monomer in order to obtain isotactic poly-β-butyrolactone useful for plastics processing. However, in particular for large-scale industrial applications, the synthetic route to these compounds is very complex and expensive, and purification is also attended by high cost (see also Seebach et al., Helv. Chim. Acta 1994, 77, pp 1099–1123 and von Lengweiler, Helv. Chim. Acta 1996, 79, pp. 670–701, and Breitschuh et al., Chimia 1990 (44), pp. 216–218, and Ohta et al., J. Chem. Soc., Chem. Commun. 1992, pp. 1725–1726).

(Mainly)syndiotactic or (mainly)isotactic poly-β-hydroxybutyrolactone is also accessible via stereospecific polymerization of R/S-β-butyrolactone (see also Gross et al., Macromolecules 1988 (21), pp. 2657–2668; Kricheldorf et al., Macromolecules 1994 (27), pp. 3139–3146). However, with these processes, too, it is never possible completely to eliminate contamination of the product by atactic poly-β-hydroxybutyrolactone content, the removal of which from the polymerization mixture is very complicated. These are therefore not useful working materials. Another disadvantage of the stereospecific polymerization processes described is their long reaction time.

Stereospecific polymerization of butyrolactone may moreover proceed with retention, inversion, or partial inversion (Hori et al., Macromolecules 1993 (26) pp. 5533–5534; Zhang et al., Polymer Preparation, 1989 (30) pp. 400–401; Jedlinski et al., Macromolecules 1998 (31) pp. 6718–6720; and Zhang et al. Macromolecules 1990 (23) pp. 3206–3212).

EP-A 0 577 206 describes the carbonylation of epoxides with the aid of a catalyst system comprising a cobalt source and hydroxy-substituted pyridine compounds. It was found that the desired primary product obtained with high selectivity, β-propiolactone, can react to some extent to give the secondary product poly-3-hydroxypropionate, in particular after a prolonged period and in the presence of certain halogen compounds as promoters. It is also disclosed that when use is made of non-hydroxy-substituted pyridine compounds, such as pyridine, there is drastic loss of both conversion and selectivity to the primary product, and in line with the overall teaching of the specification this is also expected to apply to the secondary products formed from the primary product.

It is an object of the present invention, therefore, to provide an improved process which prepares poly(3-hydroxyalkanoates) with a thermoplastic property profile and which in particular can also be carried out simply and at low cost on a large industrial scale, and in which no complicated purification or separation steps arise for starting materials and/or products, and which can also readily utilize enantiomerically pure starting materials.

We have found that this object is achieved by means of a catalytic process which prepares thermoplastic poly(3-hydroxyalkanoates) by reacting an oxirane compound with carbon monoxide, and in which the monomers are copolymerized in the presence of at least one single- or multicenter neutral transition metal complex (A) based on a metal of groups 5 to 11 of the Periodic Table of the Elements, in which the metals are present in the formal oxidation state 0, and/or at least one single- or multicenter anionic transition metal complex (B) based on a metal of groups 5 to 11 of the Periodic Table of the Elements, where multicenter transition metal complexes have metal centers which, without exception, are of the same transition metal, where the process comprises carrying out the copolymerization in the presence of at least one nucleophile other than hydroxy-substituted pyridine compounds.

The copolymerization can also be carried out in the presence of proton sources, such as acids.

In principle, transition metal complexes (A) which may be used are any of the neutral complexes based on metals of groups 5 to 11 of the Periodic Table of the Elements, where the central metal bears the formal charge 0. Examples of suitable metals are vanadium, chrome, molybdenum, tungsten, manganese, rhenium, iron, osmium, ruthenium, cobalt, iridium, rhodium, and nickel. For single-center neutral complexes it is preferable to utilize molybdenum, tungsten, cobalt, palladium, or nickel, and for multicenter neutral complexes it is preferable to utilize cobalt, ruthenium, manganese, or rhodium.

In transition metal complex (A) the ligands are generally neutral ligands. The number of ligands depends on the respective metal and varies with the normal level of coordinative saturation of the transition metal. Examples of suitable neutral ligands are carbon monoxide, nitro, nitroso, carbonate, ether, sulfoxide, amide, nitrile, and phosphine. The coordination of these ligands to the transition metal is generally by way of a free electron pair. The preferred ligand used is carbon monoxide. There may also be different ligands alongside one another in a transition metal compound (A), for example as in $Co_2(CO)_6(PMe_2Ph)_2$. Preferred transition metal complexes (A) used are $Co_2(CO)_8$, $Ru_3(CO)_{12}$, $Rh_4(CO)_{12}$, $Rh_6(CO)_{16}$, $Co_4(CO)_{12}$, $Co(CO)_3(NO)$, $Fe_2(CO)_{10}$, $Fe_2(CO)_9$, $Ni(CO)_4$, $Mn_2(CO)_{10}$, $Mo(CO)_6$, and $W(CO)_6$. Particular preference is given to $Ru_3(CO)_{12}$, $Co_4(CO)_{12}$, $Co(CO)_3(NO)$, $Ni(CO)_4$, and $Mn_2(CO)_{10}$, in particular $Co_2(CO)_8$.

It is, of course, also possible to use mixtures of various neutral complexes.

If no anionic complexes (B) are used, the amount of the neutral complexes (A) usually present in the polymerization mixture, based on the oxirane compound, are from 0.01 to 10 mol %, preferably from 0.05 to 5 mol %, and particularly preferably from 0.1 to 3 mol %.

The preparation of the transition metal complexes (A) is well known to the skilled worker, and an example is found in F. G. Stone, E. W. Abel, and G. Wilkinson, "Comprehensive Organometallic Chemistry—The Synthesis, Reactions and Structures of Organometallic Compounds", Pergamon Press, Oxford, 1982, e.g. in Vol. 5. Complexes of this type are also commercially available.

For the purposes of the present invention, anionic transition metal complexes (B) are compounds in which at least one central metal or one ligand unit has a negative formal charge. Suitable anionic transition metal compounds (B) have a central metal from groups 5 to 11, preferably from groups 8 to 10, of the Periodic Table of the Elements. Examples of metals which may be used are cobalt, iron, rhodium, and ruthenium. It is particularly preferable to use transition metal complexes (B) based on the metals cobalt or rhodium. The complexes (B) used may be single- or multicenter, the metals in the latter complexes being identical.

The ligands in the transition metal complex (B) are usually neutral ligands. The number of ligands depends on the respective metal and varies with the normal level of coordinative saturation of the transition metal. Examples of suitable neutral ligands are carbon monoxide, nitro, nitroso, carbonate, ether, sulfoxide, amide, nitrile, and phosphine. The neutral ligands utilized for the transition metal complexes (B) may generally be the same as those used for the transition metal complexes (A). The coordination of these ligands to the transition metal is usually by way of a free electron pair. The preferred ligand used is carbon monoxide. It is also possible for a complex to have different ligands alongside one another on an anionic metal center of a transition metal compound (B), e.g. as in the case of $[(P(Ph)_3)Co(CO)_3]^-$, $[(P(Me_2Ph))Co(CO)_3]^-$, $[(CNPh)Co(CO)_3]^-$, or $[Co(CO)_3(NO)]^-$. In principle, all cations are suitable cationic counterions for the transition metal compound (B).

Examples of suitable transition metal complexes (B) have the following formula (I)

$$(M_\beta^{(n+)})_m[M_\alpha(L)_4]_l, \qquad (I),$$

where the variables and indices have the following meanings:

$M_\alpha$ is a transition metal of the $8^{th}$ to $10^{th}$ group of the Periodic Table of the Elements, in particular cobalt or rhodium, having formal charge −1, L is $PR_3$, $P(OR)_3$, $NR_3$, $SR_2$, $OR_2$, CO, R—CN, R—$NO_2$, (RO)(R'O)C=O, (R)(R')C=O, (R)C=O(OR'), in particular CO, $M_\beta$ is a metal of the $1^{st}$ or $2^{nd}$ group of the Periodic Table of the Elements, Zn, or Hg, in particular Na, K, Cs, Mg, Ca, Zn, or Hg, bis(triarylphosphine)iminium, trityl, $Si(R)_3$, or $T(R)_4$, where T is N, P or As, in particular N, R, and R' are H, alkyl, aryl, or arylalkyl, m, and n are 1 or 2, and l is n×m.

Examples of radicals R and R' which may be used are, independently of one another, hydrogen, straight-chain or branched $C_1$–$C_{10}$-alkyl, such as methyl, ethyl, n-propyl, isopropyl, n-butyl, isobutyl, or tert-butyl, or n-pentyl or isopentyl, $C_6$–$C_{14}$-aryl, such as phenyl or naphthyl, or alkylaryl having from 1 to 10 carbon atoms in the alkyl moiety and from 6 to 14 carbon atoms in the aryl moiety, for example benzyl. Suitable aromatic radicals also encompass heterocyclic systems. Five- or six-membered monocycles, such as pyridyl and phenyl, are suitable aromatic radicals, as are anellated systems, such as anthracene. Preferred non-metallic cations $M_\beta$ are tetraphenyl-, tetramethyl-, tetraethyl-, and tetra-n-butylammonium, -phosphonium, and -arsenium, and also bis(triarylphosphine)iminium. Particularly suitable aryl radicals in the bis(triarylphosphine)iminium cation are phenyl and naphthyl, preference being given to bis(triphenylphosphine)iminium.

Examples of metallic cations $M_\beta$ which may be used are alkali metal cations and alkaline earth metal cations. It is preferable to utilize lithium, sodium, potassium, or cesium. Particular preference is given to transition metal complexes (B) having metallic cations $M_\beta$ if the copolymerization is carried out in the absence of an acid.

It is advantageous to utilize transition metal complexes (B) selected from the group consisting of $Li[Co(CO)_4]$, $Na[Co(CO)_4]$, $K[Co(CO)_4]$, $Cs[Co(CO)_4]$, $(R_4N)[Co(CO)_4]$, $(R_4P)[Co(CO)_4]$, $(R_4As)[Co(CO)_4]$, $(PPN)[Co(CO)_4]$, $Li[Rh(CO)_4]$, $Na[Rh(CO)_4]$, $K[Rh(CO)_4]$, $Cs[Rh(CO)_4]$, $(R_4N)[Rh(CO)_4]$, $(R_4P)[Rh(CO)_4]$, $(R_4As)[Rh(CO)_4]$, $(PPN)[Rh(CO)_4]$, $Li[Ir(CO)_4]$, $Na[Ir(CO)_4]$, $K[Ir(CO)_4]$, $Cs[Ir(CO)_4]$, $(R_4N)[Ir(CO)_4]$, $(R_4P)[Ir(CO)_4]$, $(R_4As)[Ir(CO)_4]$, $(PPN)[Ir(CO)_4]$, $Li_2[Fe(CO)_4]$, $Na_2[Fe(CO)_4]$, $K_2[Fe(CO)_4]$, $Cs_2[Fe(CO)_4]$, $(R_4N)_2[Fe(CO)_4]$, $(R_4P)_2[Fe(CO)_4]$, $(R_4As)_2[Fe(CO)_4]$, $(PPN)_2[Fe(CO)_4]$, $(PPN)[HFe(CO)_4]$, and $(PPN)_2[Fe_2(CO)_8]$, where R is methyl, ethyl, n-propyl, isopropyl, n-butyl, isobutyl, tert-butyl, phenyl, or benzyl.

Among the anionic complexes (B) having cobalt in the oxidation state −1, particular preference is given to tetraphenylphosphonium, tetraphenylarsenium, tetraphenylammonium, tetraethylphosphonium, tetraethylarsenium, and tetraethylammonium tetracarbonylcobaltate, and also sodium tetracarbonylcobaltate.

It is, of course, also possible to use mixtures of transition metal complexes (B).

The preparation of anionic transition metal complexes (B) is well known to the skilled worker. Examples of suitable preparation processes are found in F. G. Stone, E. W. Abel, and G. Wilkinson, "Comprehensive Organometallic Chemistry—The Synthesis, Reactions and Structures of Organometallic Compounds", Pergamon, Oxford, 1982, and F. G. Stone, E. W. Abel, and G. Wilkinson, "Comprehensive Organometallic Chemistry II—A Review of the Literature 1982–1994", Pergamon Press, Oxford, e.g. in Vol. 8. Complexes of this type are also commercially available.

If no neutral complexes (A) are used, the amounts of the anionic complexes (B) usually present in the polymerization mixture, based on the oxirane compound, are from 0.01 to 10 mol %, preferably from 0.05 to 5 mol %, and particularly preferably from 0.1 to 3 mol %.

The neutral complexes (A) and anionic complexes (B) may also be used together. In this instance the total amount of (A) and (B) is usually in the range from 0.01 to 10 mol %, preferably from 0.05 to 5 mol %, and particularly preferably from 0.1 to 3 mol %, based on the oxirane compound.

The molar ratio of anionic complex (B) to neutral complex (A) in the polymerization mixture in the event of use of (A) and (B) together is usually in the range from 0.1 to 100, preferably from 1 to 50, particularly preferably from 2 to 20. Very particular preference is given to (B)/(A) ratios in the range from 3 to 4. In the case of multicenter complexes, the molar ratios are based on the total amount of transition metal atoms.

In one preferred embodiment, $Co_2(CO)_8$ and/or $Ru_3(CO)_{12}$ are used as transition metal complexes (A) in a mixture with $Et_4NCoCO_4$, $NaCoCO_4$, $(PPN)CoCO_4$ and/or $Ph_4PCo(CO)_4$ as transition metal complexes (B) for the catalytic preparation of poly(3-hydroxyalkanoates).

The process of the invention can also take place in the presence of a proton source, for example in the presence of an acid, in particular of a Brönsted acid. Suitable Brönsted acids are the usual mineral acids, such as hydrochloric acid, sulfuric acid, or phosphoric acid, in dilute form or in particular in concentrated form, tetrafluoroboric acid, phenol, substituted phenols, and carboxylic acids, such as formic acid, acetic acid, trichloro- or trifluoroacetic acid, benzoic acid, glutaric acid, or adipic acid. It is preferable to use acetic acid in the form known as glacial acetic acid. For the purposes of the present invention, this means acetic acid which is anhydrous or almost anhydrous, in particular not more than 2% by volume water content. Hydrochloric acid is preferably added in ether solution. It is preferable to utilize acetic acid, in particular glacial acetic acid, hydrochloric acid dissolved in ether, benzoic acid, phenol, tetrafluoroboric acid, or a mixture of these.

The amount generally used of the acid is from 0 to 10 mol %, preferably from 1 to 2 mol %, based on the oxirane compound. It is also possible to use any desired mixture of the abovementioned acids.

The copolymerization in the process of the invention may in principle be carried out in the presence of any nucleophile other than hydroxy-substituted pyridine compounds. The term "hydroxy-substituted pyridine compound" encompasses any compound containing a pyridine ring, i.e. a six-membered heteroaromatic ring containing an imino nitrogen atom, and containing at least one hydroxy substituent, and examples include polynuclear compounds, such as quinoline and 4,4'-bipyridyl where these contain a hydroxy substituent.

Preferred nucleophiles used are basic compounds, such as compounds containing a formally trivalent atom from group 15 of the Periodic Table of the Elements, containing a formally divalent atom of group 16 of the Periodic Table of the Elements, or containing a formally monovalent atom of group 17 of the Periodic Table of the Elements, other than hydroxy-substituted pyridine compounds. These basic compounds may either be neutral or have a negative charge.

Particularly preferred nucleophiles which may be used in the process of the invention are organic compounds containing at least one atom of group 15 of the Periodic Table of the Elements, other than hydroxy-substituted pyridine compounds. Examples of particularly suitable nucleophiles are heterocyclic compounds containing nitrogen and/or phosphorus as heteroatom, and mono-, di-, and trialkyl- and/or -arylamines and mono-, di- and trialkyl- and/or -arylphosphanes, other than hydroxy-substituted pyridine compounds.

Very particularly preferred nucleophiles used in the process of the invention are those selected from the group consisting of pyridine, lutidine, imidazole, quinoline, dimethylaminopyridine, triethylamine, methylalanine, morpholine, 1,4-diazabicyclo[2.2.2]octane, and pyridine, in particular pyridine.

The nucleophile in the process of the invention may preferably be chiral, and may, for example, be used with optical purity of from 1 to 100%.

The amounts of the nucleophile used in the process of the invention are usually from 0.01 to 10 mol %, preferably from 0.1 to 5 mol %, and particularly preferably from 0.2 to 3 mol %, based on the oxirane compound.

It is also possible to use any desired mixture of the abovementioned nucleophiles.

Carbon monoxide is readily available commercially. It can also be used in a mixture with inert gases, such as argon or nitrogen, i.e. in diluted form.

Suitable oxirane compounds are ethylene oxide, and also substituted epoxides. These are usually compounds of the following formula (II):

(II)

The radicals R'' here are, independently of one another, hydrogen, halogen, the nitro group —$NO_2$, the cyano group —CN, the ester group —COOR, or a hydrocarbon group having from 1 to 32 carbon atoms, which may have substitution. Some or all of the radicals R'' in a compound (II) may be identical, or else the radicals R'' may be four different radicals.

It is preferable to utilize geminally substituted epoxides, and particularly preferable to utilize exclusively 1-substituted epoxides.

Examples of suitable hydrocarbon groups R'' are $C_{1-32}$-alkyl, such as methyl, ethyl, isopropyl, n-propyl, isobutyl, n-butyl, or tert-butyl, n-pentyl or n-hexyl, $C_{2-20}$-alkenyl, such as propenyl or butenyl, $C_3$–$C_{20}$-cycloalkyl such as cyclopropyl, cyclobutyl, cyclopentyl, or cyclohexyl, $C_{6-18}$-aryl such as phenyl or naphthyl, or $C_{7-20}$-arylalkyl, e.g. benzyl. It is also possible here for two radicals R'' located on different carbon atoms of the epoxy group to have bridging to one another and thus form a $C_{3-20}$-cycloalkylene group.

Possible substituents for the $C_{1-32}$-hydrocarbon group are in particular the following groups: halogen, cyano, nitro, thioalkyl, tert-amino, alkoxy, aryloxy, arylalkyloxy, carbonyldioxyalkyl, carbonyldioxyaryl, carbonyldioxyarylalkyl, alkoxycarbonyl, aryloxycarbonyl, arylalkyloxycarbonyl, alkylcarbonyl, arylcarbonyl, arylalkylcarbonyl, alkylsulfinyl, arylsulfinyl, arylalkylsulfinyl, alkylsulfonyl, arylsulfonyl, and arylalkylsulfonyl.

The oxirane compound used is preferably ethylene oxide, propylene oxide, butylene oxide (1-butene oxide, BuO), cyclopentene oxide, cyclohexene oxide (CHO), cycloheptene oxide, 2,3-epoxypropyl phenyl ether, epichlorohydrin, epibromohydrin, isobutene oxide (IBO), styrene oxide, or acrylic oxides. It is particularly preferable to use ethylene oxide (EO), propylene oxide (PO), butylene oxide, cyclopentene oxide, cyclohexene oxide, or isobutene oxide. Very particular preference is given to ethylene oxide and propylene oxide and mixtures of these.

For thermoplastic applications of materials, one of the important factors, if ethylene oxide is used as oxirane compound is that the polyester obtained has sufficiently high molecular weight $M_w$. For these polyesters, the process of the invention readily gives access to molar masses $M_w$ of at least 5,000 g/mol, and in particular at least 6,000 g/mol. If use is made of 1-substituted oxirane compounds, thermoplastic polyesters are obtained especially when these are not used in the form of the racemate but rather either in enantiomerically pure form or in optically enriched form in relation to the stereocenter in the 1-position, i.e. the R-1/S-1-ratio or S-1/R-1-ratio is not equal to 1. Preferred R-1/S-1-ratios used and in particular S-1/R-1 ratios used are in the range from 1/4 to 1/100, particularly preferably in the range from 1/10 to 1/40. It is particularly preferable to utilize propylene oxide with enantiomeric purity in the range from 60 to 99% ee and in particular in the range from 80 to 95% ee. Using the process of the invention it is possible to start from enantiomerically pure or optically enriched oxirane compounds and obtain polyesters with molar masses $M_W$ of at least 4,000 g/mol which have a thermoplastic property profile.

The oxirane compounds to be used for the process of the invention may be obtained by the terminal-olefin-epoxidation processes known to the skilled worker, for example. If the epoxidation proceeds non-stereospecifically, racemate separation has to be carried out. Methods of racemate separation, e.g. by means of HPLC with chiral column material, are known to the skilled worker. It is advantageous to prepare the oxirane compound directly in enantiomerically pure or optically enriched form from a terminal olefin, via established stereoselective processes. An example of a suitable process is that known as Sharpless epoxidation (see also J. Am. Chem. Soc. 1987 (109), pp. 5765 et seq. and 8120 et seq.; and "Asymmetric Synthesis", Ed. J. D. Morrison, Academic Press, New York, 1985, Volume 5, Chapter 7 and 8).

Optically enriched oxirane compounds are also obtained from terminal olefins and, respectively, racemic terminal epoxides via processes described by Jacobsen et al. (Tetrahedron Lett. 1997, 38, pp. 773 to 776; and J. Org. Chem. 1998, 63, pp. 6776–6777, J. Org. Chem. 1999, 64, 2164–2165) which are also simple to carry out on a large industrial scale (see also Acc. Chem. Res. 2000, 33, pp 421–431).

It is, of course, also possible to prepare optically enriched oxirane compounds by adding an appropriate amount of the racemate to the enantiomerically pure oxirane compound.

Terminal-double-bond compounds which may be used are in principle any of the olefins in this class of compounds, e.g. propene, 1-butene, 1-pentene, 1-hexene, 1-heptene, or 1-octene.

The process of the invention prepares the poly(3-hydroxyalkanoates) by reacting oxirane compounds and carbon monoxide in the presence of the catalyst mixture described and, where appropriate, in the presence of proton sources, such as acids.

It is generally also necessary to add a solvent, mostly in small amounts, its main purpose being to introduce the catalyst compounds, the nucleophile, and/or, where appropriate, the proton source into the polymerization mixture.

It is also possible to conduct the reaction as a gas-phase polymerization without solvent by applying the catalyst components (A) and (B) to a particulate carrier material, e.g. silica or aluminum oxide.

Suitable solvents encompass in particular polar solvents, such as ether compounds, e.g. tetrahydrofuran, diethyl ether, dioxane, 2,5,8-trioxanone, anisole, dimethoxyethane (DME), and diethylene glycol dimethyl ether (diglyme), and also dimethylformamide or dimethyl sulfoxide.

The polymerization is usually carried out under superatmospheric pressure of carbon monoxide. However, polymer formation is also found when the carbon monoxide pressure is one atmosphere. The carbon monoxide pressure is preferably in the range from 2 to 250 bar, in particular in the range from 10 to 80 bar.

Suitable polymerization temperatures are within the range from room temperature, i.e. about 25° C., to 150° C. and are preferably set at values in the range from 35 to 115° C.

The polymerization by the process of the invention may be carried out either batchwise or continuously.

The procedure for conducting the reaction is generally that the transition metal complexes (A) and/or (B) are added individually, simultaneously, or premixed to the reaction vessel, where appropriate with cooling. The nucleophile and/or the oxirane compound, too, may, where appropriate, be admixed with the solution/suspension of the catalyst components (A) and/or (B) before these are transferred to the reaction vessel. It is also possible to introduce the nucleophile and/or the oxirane compound directly into the reaction vessel. The acid is preferably the final component added, but any other sequence is also possible. The polymerization is preferably carried out under inert conditions, i.e. in the absence of moisture and air.

Termination of the polymerization, isolation, and purification may use well-known methods. For example, the polymer product may be precipitated by adding low-molecular-weight alcohols, such as methanol, and isolated by simple means using filtration.

Isotactic poly(3-hydroxyalkanoates) may be obtained from enantiomerically pure oxirane compound using the process of the invention. If use is made of optically enriched oxirane compounds, predominantly isotactic polymers are obtained, the degree of optical purity corresponding directly to the degree of isotacticity achieved in the copolymer. The thermoplastic property profile of this biodegradable class of polymer may be adjusted very simply and precisely for desired applications in this way, and also via the molecular weight.

The molar masses $M_W$ of the polymers obtained by the process of the invention are generally greater than 3,500 g/mol, preferably greater than 4,000 g/mol. The polydispersities are generally below 10, preferably below 1.5, and particularly preferably below 1.4. The melting points of the resultant polymers are usually above 50° C., preferably above 70° C., particularly preferably above 90° C.

The polymers obtained by the process of the invention may be processed by injection molding, blow molding, spinning, rotational moldings, or extrusion. It is also possible to coat metallic, ceramic, or other surfaces, e.g. those made from polymer materials, wood, paper, or cellulose.

The resultant polymers are suitable for producing fibers, films, moldings, or coatings. They are also suitable blend components in plastics. Examples of suitable blends are obtained with polybutylene terephthalate or the biodegradable polymer Ecoflex®, a copolymer of adipic acid, butanediol, and terephthalic acid. Details of the composition, structure, and preparation of Ecoflex® are found by way of example in European Chemical News, 1995 (7), p. 36.

The examples below provide further explanation of the present invention.

EXAMPLES

Starting Materials:

Diglyme is purchased from Fluka (stored over molecular sieve) and degassed by means of ultrasound under reduced pressure prior to every use. All of the other substances were purchased from Fluka and in each case used without further purification for the polymerization.

Test Methods:

$^1$H NMR spectra were measured on Bruker AMX 400 equipment.

Experiment 1

0.23 g of tetraethylammoniumcobalt carbonylate Et$_4$N [Co(CO)$_4$] was dissolved in 20 ml of diglyme under nitrogen at room temperature, and this solution was transferred by means of a cannular into a high-pressure reactor (reactor volume 300 ml). Carbon monoxide was then introduced under pressure until the pressure reached 10 bar. 15 ml of racemic propylene oxide were then added via a pressure burette. Pyridine (100 μl) dissolved in diglyme (3 ml) was also added by way of a pressure burette. The temperature was then increased and carbon monoxide was introduced under pressure until a temperature of 70° C. and a pressure of 40 bar were reached. The polymerization was carried out for a period of 3 h, with stirring. The polymerization was terminated by reducing the pressure to ambient pressure and lowering the temperature to room temperature. The resultant reaction mixture was passed through an aluminum-oxide-packed column (diameter 2.5 cm) to remove the cobalt salts. The diglyme and volatile by-products were then removed in vacuo. The yield of the resultant product was 9.5 g. The product was identified by means of $^1$H NMR spectroscopy as poly-3-hydroxybutyrate.

Experiments 2–3 and Comparative Experiment 1c

Experiments 2–3 and comparative experiment 1c were carried out as described in experiment 1, but the substances and amounts given in table 1 replaced the transition metal complexes and nucleophiles mentioned in experiment 1 and the amount of transitiion metal complex mentioned in experiment 1.

Table 1 also gives the product yields achieved in each case.

TABLE 1

| Experiment | Transition metal complex | Amount of transition metal complex (mg) | Nucleophile | Product yield (g) |
| --- | --- | --- | --- | --- |
| 1 | Et$_4$[Co(CO)$_4$] | 230 | Pyridine | 9.5 |
| 2 | Et$_4$[Co(CO)$_4$] | 207 | 2-Methylpyridine | 4.6 |
| 3 | Ph$_3$Si[Co(CO)$_4$] | 244 | Pyridine | 9.3 |
| 1c | Et$_4$[Co(CO)$_4$] | 215 | 3-Hydroxypyridine | 2.1 |

The experiments prove that better yields are obtained through the use of the nucleophiles which can be used in the inventive process.

The invention claimed is:

1. A catalytic process for preparing poly(3-hydroxyalkanoates) by copolymerizing an oxirane compound with carbon monoxide in the presence of
   a) at least one single- or multicenter neutral transition metal complex (A) based on a metal of groups 5 to 11 of the Periodic Table of the Elements, in which the metal center(s) is/are present in the formal oxidation state 0, and/or
   b) at least one single- or multicenter anionic transition metal complex (B) based on a metal of groups 5 to 11 of the Periodic Table of the Elements, where multicenter transition metal complexes have metal centers which, without exception, are of the same transition metal, which comprises carrying out the copolymerization in the presence of at least one nucleophile which is an organic compound containing at least one atom of group 15 of the Periodic Table of the Elements, other than hydroxy-substituted pyridine compounds.

2. A process as claimed in claim 1, wherein the transition metal complex (B) is a compound of the formula (I)

$$(M_\beta^{(n+)})_m[M_\alpha(L)_4]_l, \quad (I),$$

where the variables and indices have the following meanings:
   $M_\alpha$ is a transition metal of the $8^{th}$ to $10^{th}$ group of the Periodic Table of the Elements having formal charge −1,
   L is PR$_3$, P(OR)$_3$, NR$_3$, SR$_2$, OR$_2$, CO, R—CN, R—NO$_2$, (RO)(R'O)C=O, (R)(R')C=O, (R)C=O(OR'),
   $M_\beta$ is a metal of the $1^{st}$ or $2^{nd}$ group of the Periodic Table of the Elements, Zn, or Hg, bis(triarylphosphine)iminium, trityl, Si(R)$_3$, or T(R)$_4$, where
   T is N, P or As,
   R, and R' are H, alkyl, aryl, or arylalkyl,
   m, and n are 1 or 2, and
   l is n×m.

3. A process as claimed in claim 2, wherein $M_\beta$ in formula (I) is a metal of the $1^{st}$ or $2^{nd}$ group of the Periodic Table of the Elements, Zn, or Hg.

4. A process as claimed in any of claims 1 to 3, wherein the copolymerization is carried out in the presence of a proton source.

5. A process as claimed in claim 4, wherein the proton source used comprises an acid selected from the group consisting of acetic acid, in particular glacial acetic acid, hydrochloric acid, for example dissolved in ether, benzoic acid, tetrafluoroboric acid, phenol, and mixtures of these.

6. A process as claimed in any of claims 1 to 5, wherein the transition metal complex (A) is selected from the group consisting of Co$_2$(CO)$_8$, Ru$_3$(CO)$_{12}$, Rh$_4$(CO)$_{12}$, Rh$_6$(CO)$_{16}$, Co$_4$(CO)$_{12}$, Co(CO)$_3$(NO), Fe$_2$(CO)$_{10}$, Fe$_2$(CO)$_9$, Ni(CO)$_4$, Mn$_2$(CO)$_{10}$, Mo(CO)$_6$, and W(CO)$_6$.

7. A process as claimed in any of claims 1 to 6, wherein the nucleophile is selected from the group consisting of heterocyclic compounds containing nitrogen and/or phosphorus as heteroatom, and mono-, di-, and trialkyl- and/or -arylamines, and mono-, di-, and trialkyl- and/or -arylphosphanes, other than hydroxy-substituted pyridine compounds.

8. A process as claimed in any of claims 1 to 7, wherein the nucleophile is selected from the group consisting of pyridine, lutidine, imidazole, quinoline, dimethylaminopyridine, triethylamine, methylalanine, morpholine, 1,4-diazabicyclo[2,2,2]octane, and pyridine.

9. A process as claimed in any of claims 1 to 8, wherein the nucleophile is pyridine.

10. A process as claimed in any of claims 1 to 9, wherein the nucleophile is chiral.

11. A process as claimed in any of claims 1 to 10, wherein the nucleophile is optically active.

12. A process as claimed in any of claims 1 to 11, wherein use is made of an oxirane compound in enantiomerically pure or optically enriched form.

13. A process as claimed in any of claims 1 to 12, wherein the oxirane compound is propylene oxide (PO).

14. A process as claimed in any of claims 1 to 12, wherein the oxirane compound is ethylene oxide (EO) or isobutene oxide.

* * * * *